United States Patent
He et al.

(10) Patent No.: US 10,108,749 B2
(45) Date of Patent: Oct. 23, 2018

(54) OPTIMIZING POWER FLOWS USING HARMONY SEARCH WITH MACHINE LEARNING

(71) Applicant: NEC Laboratories America, Inc., Princeton, NJ (US)

(72) Inventors: Yanyi He, San Jose, CA (US); Ratnesh Sharma, Fremont, CA (US)

(73) Assignee: NEC Corporation (JP)

( * ) Notice: Subject to any disclaimer, the term of this patent is extended or adjusted under 35 U.S.C. 154(b) by 396 days.

(21) Appl. No.: 14/933,696

(22) Filed: Nov. 5, 2015

(65) Prior Publication Data

US 2016/0125097 A1 May 5, 2016

Related U.S. Application Data (60) Provisional application No. 62/075,492, filed on Nov. 5, 2014.

(51) Int. Cl.
  *G05B 19/042* (2006.01)
  *G06F 17/30* (2006.01)
  *G06N 99/00* (2010.01)

(52) U.S. Cl.
  CPC ..... *G06F 17/30979* (2013.01); *G05B 19/042* (2013.01); *G06N 99/005* (2013.01); *G05B 2219/2639* (2013.01)

(58) Field of Classification Search
  CPC .......... G05B 19/042; G05B 2219/2639; G06F 17/30979; G06N 99/005
  See application file for complete search history.

(56) References Cited

U.S. PATENT DOCUMENTS

| | | | |
|---|---|---|---|
| 9,270,117 B2* | 2/2016 | Umland | H02J 3/26 |
| 2012/0280566 A1* | 11/2012 | Umland | H02J 3/26 |
| | | | 307/32 |
| 2014/0343909 A1* | 11/2014 | Guerillot | G01V 11/00 |
| | | | 703/2 |
| 2015/0261892 A1* | 9/2015 | Bozchalui | G06F 17/5004 |
| | | | 703/1 |

(Continued)

OTHER PUBLICATIONS

Geem, et al., "A New Heuristic Optimization Algorithm: Harmony Search," Simulation, Feb. 2001, pp. 60-68, vol. 76, No. 2.

(Continued)

*Primary Examiner* — Abdelmoniem Elamin
(74) *Attorney, Agent, or Firm* — Joseph Kolodka (57) ABSTRACT

Systems and methods for optimizing power flows using a harmony search, including decoupling phases in a multi-phase power generation system into individual phase agents in a multi-phase power flow model for separately controlling at least one of phase variables or parameters. One or more harmony segments from harmony memory are ranked and selected based on a utility value determined for each of the decoupled phases. A harmony search with gradient descent learning is performed to move the selected harmony segments to a better local neighborhood. A new utility value for each of the selected segments is determined based on historical performance, and the harmony memory is iteratively updated if one or more of the new utility values are higher than a utility value of a worst harmony segment stored in the harmony memory.

18 Claims, 5 Drawing Sheets

(56) References Cited

U.S. PATENT DOCUMENTS

2015/0346753 A1* 12/2015 Gan ..................... G06Q 50/06
                                                      700/295
2016/0036226 A1*  2/2016 Gan ......................... H02J 3/00
                                                      700/286
2016/0043548 A1*  2/2016 Bozchalui ............ G05B 13/041
                                                      700/291

OTHER PUBLICATIONS

Samiee, et al., "Security Constrained Unit Commitment of Power Systems by a New Combinatorial Solution Strategy Bomposed of Enhanced Harmony Search Algorithm and Numerical Optimization," International Journal of Electrical Power & Energy Systems, Dec. 2013, pp. 471-481, vol. 44 No. 1.

* cited by examiner

OPTIMIZING POWER FLOWS USING HARMONY SEARCH WITH MACHINE LEARNING

RELATED APPLICATION INFORMATION

This application claims priority to provisional application No. 62/075,492 filed Nov. 5, 2014, the contents of which are incorporated herein by reference.

BACKGROUND OF THE INVENTION

Technical Field

The present invention relates generally to optimizing power flows in energy distribution systems, and more particularly, to a system and method for optimizing power flows using a harmony search with machine learning.

Description of the Related Art

Voltage regulation is an important factor in electrical distribution systems as energy utility companies must keep customers' service voltage (e.g., voltage at the customer's meter, load side of point of common coupling (PCC)) within acceptable ranges. Voltage regulation may include power system modeling and/or system power flow calculations for use in planning and/or operation of power systems. Power flow calculations may be employed in attempts to optimize distribution of power. For example, network reconfiguration, service restoration, capacitor placement, etc, may require calculating a large number (e.g., hundreds, thousands, etc.) of power flow problems when planning and/or controlling distribution of power in a power distribution system.

Grid-connected energy storage systems (ESSs) are a fast growing global market. Recently, increases in the penetration of renewable energy resources into grid-connected ESSs have presented a challenge to the traditional design and operation of electric power systems. The existing power grid was designed for centralized power generation with unidirectional power flow. With renewable energy (or any other type of distributed generation of electricity), power is effectively generated everywhere and flows in multiple directions. However, the intermittent and highly variable nature of distributed generation causes power quality and/or reliability issues, which leads to increased energy costs. Furthermore, a critical problem is a wide variation of system voltage. For example, as the load continues to increase, utilities attempt to push the grid to transfer more and more power, which may lead to power distribution problems, including, for example, unbalanced power flows.

Conventionally, models of systems including unbalanced power flows have been employed to describe/simplify power distribution systems for use in planning and/or controlling distribution of power. However, conventional unbalanced power flow models are nonlinear with integer variables, and as such, are extremely difficult and processor intensive to solve for large-scale distribution systems (e.g., shopping malls, cities, etc.). Power applications in distribution systems with unbalanced multi-phase power flows are becoming more prevalent, and computation speed of power flow calculations are an obstacle for attaining optimal and sustainable power supply (e.g., for industrial applications) with unbalanced power flows. Moreover, although conventional systems have employed harmony search methods in single-phase optimal power flow problems, conventional methods cannot be effectively applied to unbalanced multi-phase power flows.

SUMMARY

A method for optimizing power flows using a harmony search, including decoupling electrical phases in a multi-phase power generation system into individual phase agents in a multi-phase power flow model for separately controlling at least one of phase variables or parameters. One or more harmony segments from harmony memory are ranked and selected based on a utility value determined for each of the decoupled phases. A harmony search with gradient descent learning is performed to move the selected harmony segments to a better local neighborhood. A new utility value of the selected segments is determined based on historical performance, and the harmony memory is iteratively updated with the selected segments if the new utility value of one or more of the selected segments is higher than that of a worst harmony segment stored in the harmony memory.

A system for optimizing power flows using a harmony search, including a power conditioning device for connecting to a power generation system to sense and decouple electrical phases in a multi-phase power flow model into corresponding individual phase agents for separately controlling at least one of phase variables or parameters. A processor is configured to rank and select one or more harmony segments from harmony memory based on a utility value determined for each of the decoupled phases, and to perform the harmony search with gradient descent learning to move the selected harmony segments to a better local neighborhood. A new utility value for each of the selected segments is determined based on historical performance, and the harmony memory is iteratively updated if one or more of the new utility values are higher than a utility value of a worst harmony segment stored in the harmony memory.

A computer-readable storage medium including a computer-readable program, wherein the computer-readable program when executed on a computer causes the computer to perform the steps of optimizing power flows using a harmony search, including decoupling electrical phases in a multi-phase power generation system into individual phase agents in a multi-phase power flow model for separately controlling at least one of phase variables or parameters. One or more harmony segments from harmony memory are ranked and selected based on a utility value determined for each of the decoupled phases. A harmony search with gradient descent learning is performed to move the selected harmony segments to a better local neighborhood. A new utility value of the selected segments is determined based on historical performance, and the harmony memory is iteratively updated until a criteria is reached if the new utility value of the selected segments is higher than that of a worst harmony segment stored in the harmony memory.

These and other advantages of the invention will be apparent to those of ordinary skill in the art by reference to the following detailed description and the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to systems and methods for voltage regulation by optimizing and controlling power flows using a controller including a harmony search with machine learning. In a particularly useful embodiment, a novel harmony search method may be employed to coordinate with multi-agent power flow simulations to increase the speed of computations and reduce processor requirements for multi-phase (e.g., three-phase) unbalanced power flow optimization problems to efficiently control power flow distribution in power systems. The present principles may also be employed for single-phase power flow systems according to various embodiments.

In one embodiment, power flows may be controlled based on results of a multi-phase harmony search with machine learning according to the present principles. Multiple phases in a three-phase unbalanced power flow model/problem may be decoupled and treated (e.g., processed) as an individual agent with artificial intelligence. This structure may enable parallel computation of multiple agents, which speeds up optimization computations. Individual agents may select a harmony of a higher ranking with higher probability, and may transform (e.g., morph) and merge the harmonies to generate a complete solution in accordance with improvisation rules according to various embodiments of the present principles.

In one embodiment, each agent may receive or determine a list of harmonies, and the harmonies are ranked by their historical return. If the rank is high, then the harmony has a higher probability to be selected in to next round. For example, harmonies h1 and h2 may have a historical return, r1 and r2, respectively. If r1>r2, then h1 would have a higher probability (e.g., $r1/(r1+r2)$) to be selected as compared to r2 in this example.

In one embodiment, phase agents may employ gradient-descent learning to move the harmonies to a better local neighborhood. A better local neighborhood may be determined by performing a harmony search of the nearby local neighborhood (e.g., $h1\_new=h1+\Delta h$), and if h1_new returns a higher value, then h1_new may be categorized as a better local neighborhood according to various embodiments of the present principles.

The phase agents may be responsible for their own phase-related constraint violations and/or partial system cost increments according to the present principles. It may be determined whether to keep or discard selected harmonies based on historical performance, and the harmony memories of all phase agents may continually update until a stopping criteria/threshold is reached according to the present principles. In some embodiments, the computation time and costs (e.g., of complex three-phased unbalanced power flow problems) may be reduced using a multi-agent harmony search with learning, thereby reducing overall system costs, speeding up control of a power system, and optimizing unbalanced power flows according to the present principles.

It should be understood that embodiments described herein may be entirely hardware or may include both hardware and software elements, which includes but is not limited to firmware, resident software, microcode, etc. In a preferred embodiment, the present invention is implemented in hardware. The present invention may be a system, a method, and/or a computer program product. The computer program product may include a computer readable storage medium (or media) having computer readable program instructions thereon for causing a processor to carry out aspects of the present invention.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
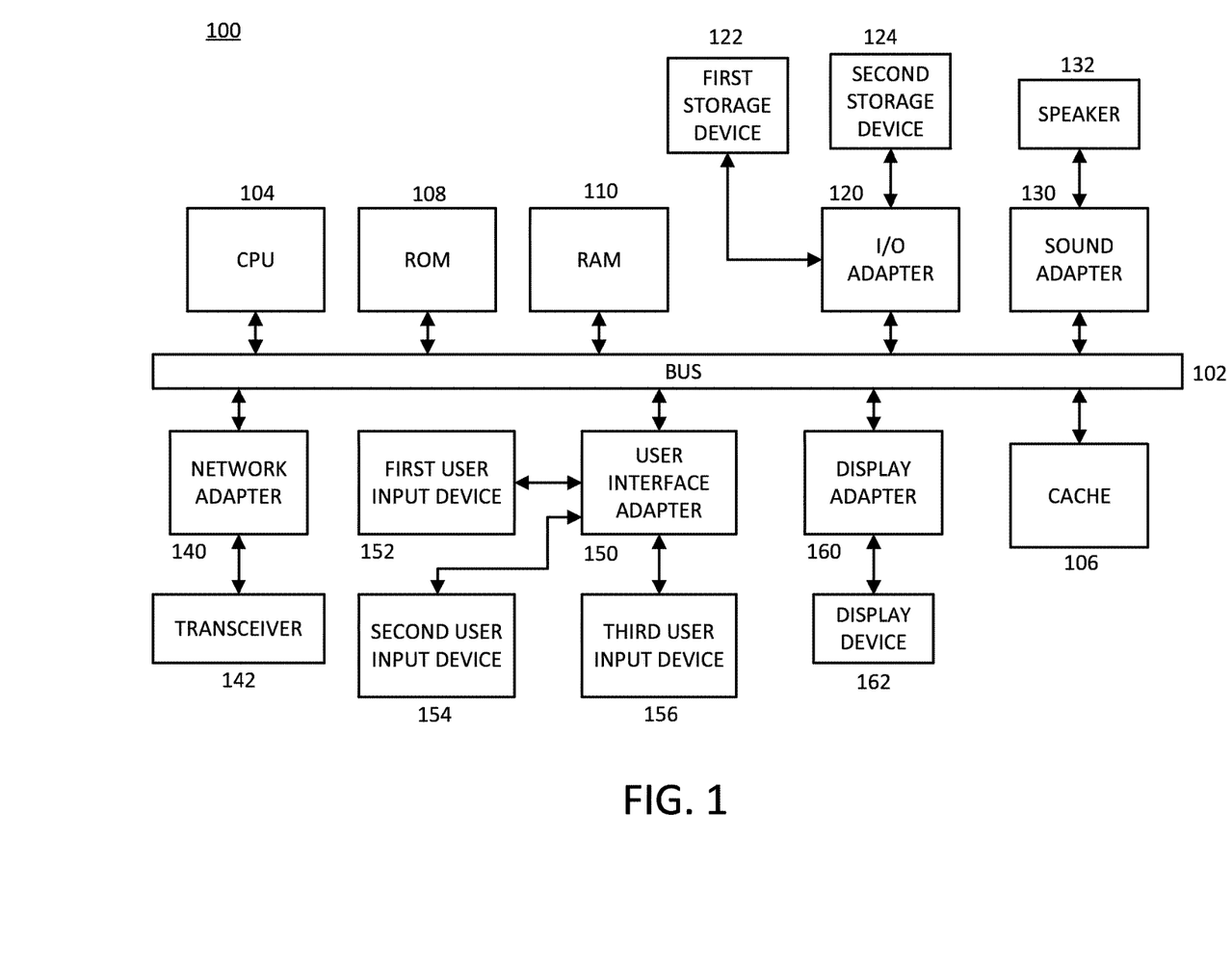
FIG. 1 shows an exemplary processing system to which the present principles may be applied, in accordance with an embodiment of the present principles.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 300 and 500 described below with respect to FIGS. 3 and 5, respectively, is a system for implementing respective embodiments of the present principles. Part or all of processing system 100 may be implemented in one or more of the elements of systems 300 and 500.

Figure 2:
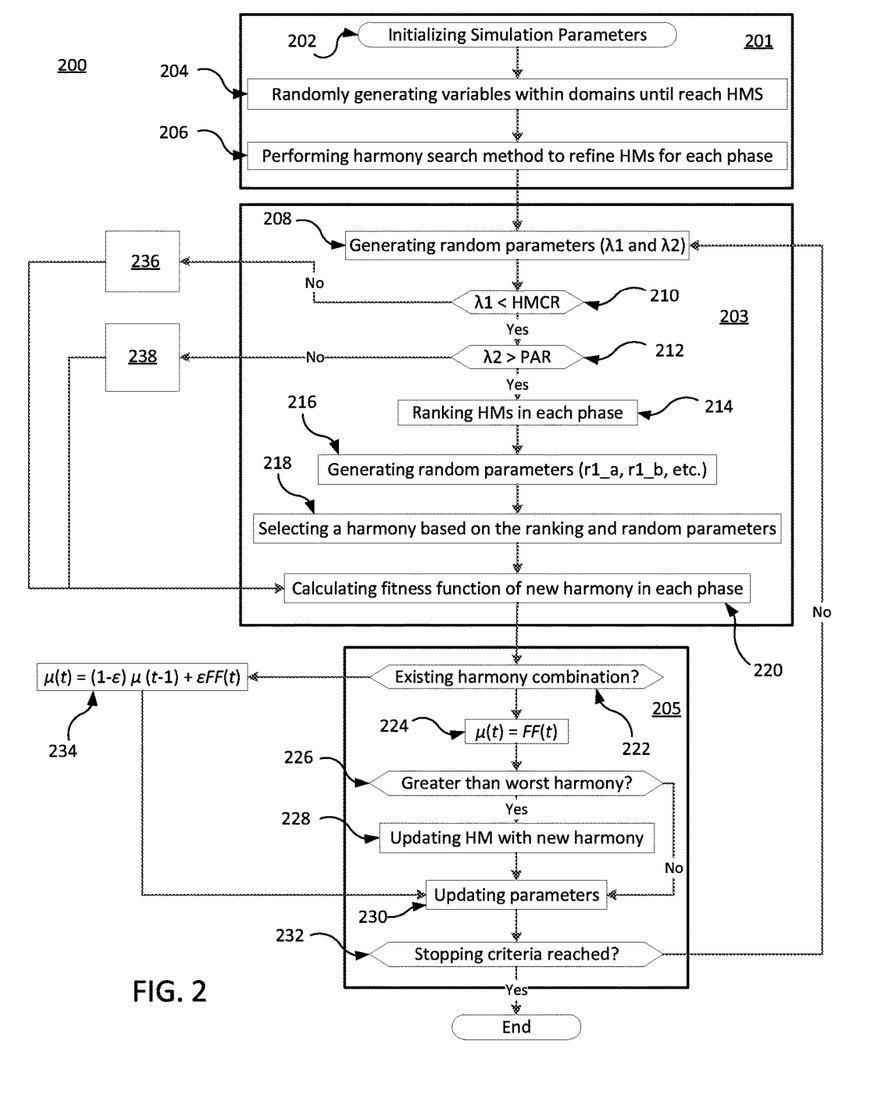
FIG. 2 is a block/flow diagram of an exemplary method for optimizing power flows using a harmony search with learning, in accordance with an embodiment of the present principles.
Figure 3:
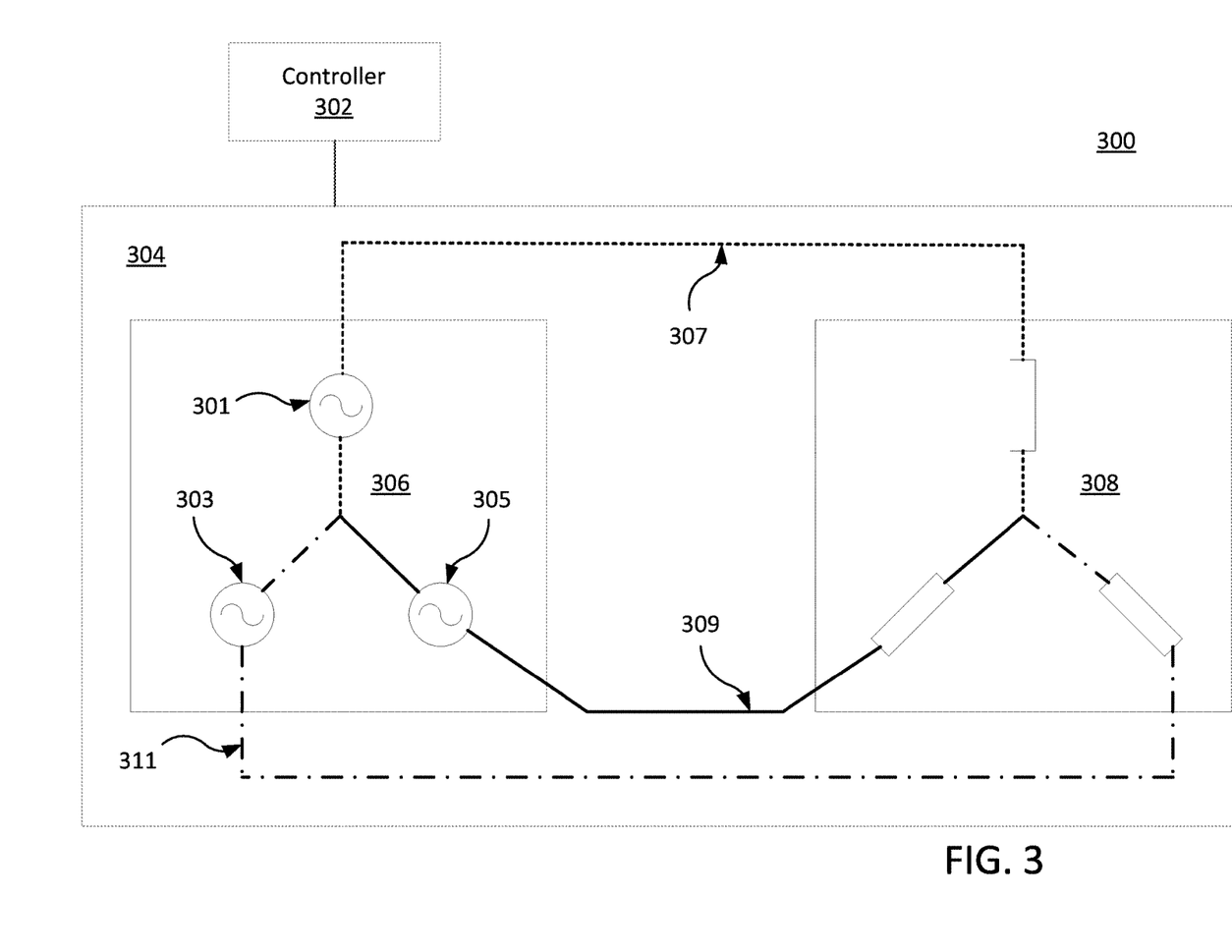
FIG. 3 shows an exemplary three phase power distribution system, to which the present principles may be applied, in accordance with an embodiment of the present principles.
Figure 4:
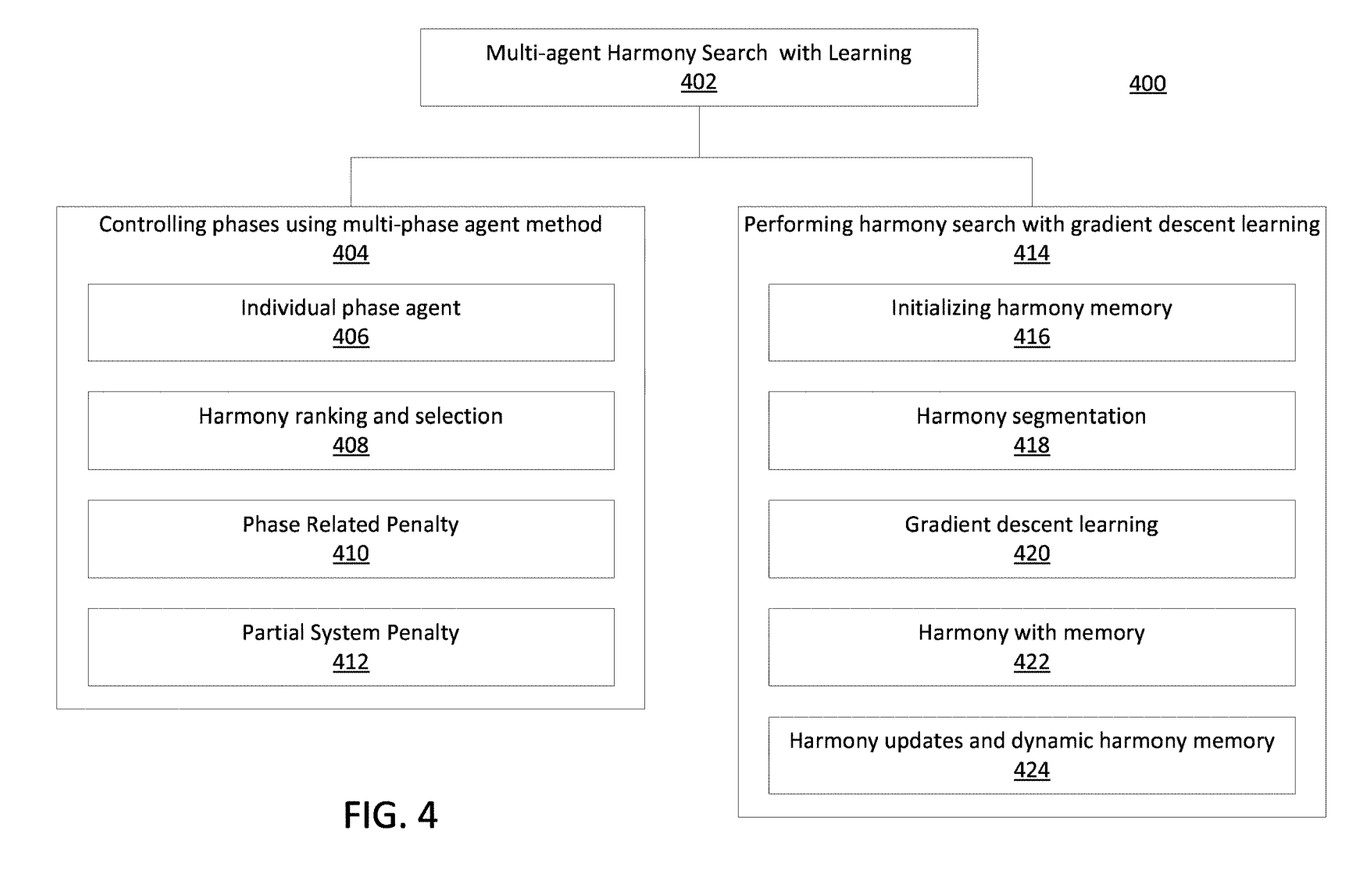
FIG. 4 shows an exemplary method for optimizing power flows using a multi-agent harmony search with learning, in accordance with an embodiment of the present principles.

Further, it is to be appreciated that processing system 100 may perform at least part of the methods described herein including, for example, at least part of methods 200 and 400 of FIGS. 2 and 4, respectively. Similarly, part or all of systems 300 and 500 may be used to perform at least part of methods 200 and 400 of FIGS. 2 and 4, respectively.

Referring now to FIG. 2, a block/flow diagram of an exemplary method 200 for optimizing power flows using a harmony search with learning is illustratively depicted in accordance with an embodiment of the present principles. In one embodiment, a formulation of a nonlinear problem for optimal power flows may be represented as follows:

$$\min f(x,z) \quad (1)$$

$$s.t. \ g(x,z)=0 \quad (2)$$

$$\underline{h} \leq h(x,z) \leq \overline{h} \quad (3)$$

wherein (x, z) is an objective function (e.g., cost minimization, loss minimization, etc.), g(x, z) are power flow balance equations, h(x, z) are capacity limit equations, x represents continuous decision variables with dimension n (e.g., voltages, angles, etc.), and z represents integer decision variables with dimension m (e.g., transformer tap ratios). In one embodiment, a fitness function may be defined as the summation of an objective function and a penalty function, and may be represented as follows:

$$FF(HV) = \frac{\exp\{\alpha \max(g(x, z)) - \beta \min\{0, h - \underline{h}, \overline{h}\}\}}{\exp\{f_0 - f(x, z)\}} \quad (4)$$

In one embodiment, in block 201, preparation for performing a multi-phase (e.g., three-phase) power flow using a harmony search with learning may be performed in block 201 according to the present principles. It is noted that the present principles will be described herein with respect to a three-phase power flow for simplicity of illustration, but the present principles may be applied to power flows with any number of phases according to various embodiments. During preparation in block 201, each of the three phases may be treated during processing as three agents moving toward optimization using the harmony search method according to the present principles.

In block 202, simulation parameters may be initialized according to the present principles. In one embodiment, harmony memory consideration rate (HMCR) and pitch adjustment rate (PAR) may be employed for the harmony search. In block 202, harmony memory (HM) may be initialized, and may include all individuals of harmony search populations. Each individual may be represented as a harmony vector (HV), and the size of the HM may be the number of the populations. The size of the HM is referred to as HMS, and the harmony memory structure may be represented as follows:

$$HM = \begin{bmatrix} HV^1 \\ HV^2 \\ \vdots \\ HV^{HMS} \end{bmatrix} = \begin{bmatrix} x_1^1 & \cdots & z_m^1 \\ x_1^2 & \cdots & z_m^2 \\ \vdots & \cdots & \vdots \\ x_n^{HMS} & \cdots & z_m^{HMS} \end{bmatrix} \quad (5)$$

In one embodiment, the objective and fitness functions of each of the individuals of harmony search populations may also be calculated and stored, and feasibility of the individuals in the harmony memory is not necessary according to various embodiments of the present principles.

In some embodiments, parameters specified/generated in block 202 may include, for example, harmony memory size (HMS) (e.g., a number of solution vectors simultaneously existing in harmony memory); harmony memory consideration rate (HMCR) (e.g., 0≤HMCR≤1, which is a rate of memory consideration); pitch adjusting rate (PAR) (e.g., 0≤PAR≤1, which is a rate of pitch adjustment), individual harmony vectors (HZ), and/or a maximum number of iterations (e.g., threshold, criteria, etc.) according to the present principles.

In one embodiment, variables (e.g., HMs) may be randomly generated within domains until HMS (e.g., threshold, criteria, etc.) is reached in block 204. For example, HMs for each phase may be randomly generated in block 204 while treating each phase independently according to some embodiments of the present principles. In block 206, a baseline harmony search calculation may be performed to refine MSs for each phase by, for example, pruning randomly selected harmonies in accordance with the baseline harmony search calculation. Coupling parameters may be ignored in block 206, as it may be assumed that the coupling parameters include zeroes during the preparation in block 201.

In one embodiment, improvisation (e.g., generation) of a new harmony may be performed in block 203 according to the present principles. In one embodiment, zero coupling parameters may no longer be assumed in penalty or fitness function calculations. In some embodiments, the harmonies may be selected and/or transformed/morphed using gradient descent when necessary (e.g., as determined using random variables $\lambda_1$ and $\lambda_2$), and the selected and/or transformed harmonies may be combined in block 203 according to the present principles.

In block 208, random numbers/parameters (e.g., $\lambda_1$ and $\lambda_2$, etc.) may be generated from a uniform distribution (e.g., located within [0, 1]). If $\lambda_1$ is determined to be less than HMCR (e.g., a predefined HMCR) in block 210 and $\lambda_2$ is determined to be greater than PAR (e.g., a predefined PAR) in block 212, the HMs may be ranked in block 214 according to an HMs utility (e.g., determined utility value) in each phase according to the present principles.

In one embodiment, random parameters (e.g., HMCR, PAR, etc.) may be selected and/or generated in block 216. For example, $x_i^{new}$ and $z_i^{new}$ of a new harmony vector ($HV^{new}$) may be randomly selected from among values stored in an $i^{th}$ column of a data structure in HM. For example, the matrix shown in equation (5) above is an exemplary representation of HM including all individuals of harmony search populations (e.g., harmony vectors (HVs)). The HM may be initially filled with as many randomly generated solution vectors as HMS, and the new harmony vector may be selected from the solution vectors in the HM in block 216 according to the present principles. In one embodiment, harmonies are selected with respect to the ranking in block 214 and the random parameters in block 216, and harmonies of higher ranks with higher probabilities in each phase may be selected according to the present principles.

If $\lambda_1$ is determined to be less than HMCR in block 210 and $\lambda_2$ is determined to be less than PAR in block 212, variables may be shifted to the new neighborhood values (e.g., new harmony vectors (HVs)) in block 238, and the new HVs may be determined as follows:

$$HV^{new} = HV^0 + \theta\, BW, \qquad (6)$$

where $\theta$ represents a random variable following binomial distribution (e.g., with 0.5 probability of choosing 1 or −1) and BW is bandwidth (e.g., which may be a parameter for determining how much further to continue with $\theta$) according to one embodiment of the present principles.

In some embodiments, gradient descent learning may be employed for moving to a better local neighborhood in block 238 using the following equation:

$$x_j^{new} = x_j^0 - \alpha \frac{\partial J_j(x)}{\partial x_j^0}, \qquad (7)$$

where $x_j^0$ is a selected harmony in phase j variables, $\alpha$ represents learning parameters, a small scale $\partial J_j(x)$ represents a cost function of agent j (which may include partial system cost and phase constraint violation penalties), and $x_j^{new}$ represents improvisation harmony according to the present principles.

If $\lambda_1$ is determined to be greater than HMCR in block 210, a new harmony (e.g., HV) may be generated in block 236, and may be determined as follows:

$$x_1^{new} = x_1^{best} - \beta(x_1^{best} - x_1^{random}) \qquad (8).$$

In some embodiments, any harmony from HM may be selected as the new harmony in block 236. A fitness function of the new harmony may be calculated for each phase (e.g., agent) in block 220 based on the new harmonies determined in blocks 236 and/or 238 according to various embodiments of the present principles. The fitness function calculated in block 221 may include, for example, shared objective and individual penalty function calculations according to the present principles.

In one embodiment, further improvisation and updating may be performed in block 205 according to the present principles. In block 222, it is determined whether there is an existing harmony combination (e.g., a new HV generated from a combination of existing vectors (e.g., all harmonies in HM)), and if yes, a utility function (e.g., utility score/value based on, for example, a function of cost, revenue, voltage, etc.) of each harmony may be calculated in block 224 (e.g., using a Fast Fourier Transform method). The utility score may be based on, for example, the objective and/or fitness functions. In some embodiments, harmonies which have weak (e.g., smaller return value), or no history memories may be transformed/morphed (e.g., into a new HM) according to various embodiments of the present principles.

In one embodiment, a newly generated harmony (e.g., $HV^{new}$) may be compared with the worst HV in HM (e.g., using utility score/value and/or ranking of harmonies) in block 226, and if the new harmony (e.g., $HV^{new}$) is better than the worst HV in HM, then the HM may be updated with the new harmony in block 228. If $HV^{new}$ is not better than the worst HV in HM, then $HV^{new}$ may be discarded, and the HM may not be updated (e.g., remains the same) in block 228. In some embodiments, parameters may be updated in block 230, and it may be determined whether a stopping criterion (e.g., maximum number of improvisations, convergence criteria, predefined threshold, etc.) has been reached in block 232. If yes, the process may end, and if no, the process may be iterated from block 208 until a stopping criteria is reached in block 232 according to various embodiments of the present principles In one embodiment, if there is no existing harmony combination in block 222, a utility value of each harmony segment may be updated using not only the new fitness function value determined in block 220, but rather the utility value of each harmony segment may be updated in block 234 using both historical and current (e.g., new) fitness function values using the following equation:

$$\mu(t) = (1-\varepsilon)\mu(t-1) + \varepsilon FF(t), \qquad (9)$$

where $\mu(t)$ is the utility value in a $t^{th}$ iteration before selection and morphing, and $\varepsilon$ is the memory rate. Parameters may be then updated in block 230, and it may be determined whether a stopping criteria has been reached in block 232. If yes, the process may end, and if no, the process may be iterated from block 208 until a stopping criteria (e.g., a predefined threshold) is reached in block 232 according to the present principles.

In some embodiments, empirical (e.g., parameter) adjustments may be performed during execution of the method 200 according to the present principles. Power systems may be very complex, and as such, constant HM parameters may not be able to converge fast enough to keep up with demands. Thus, parameter adjustments may be performed as needed, For example, for illustrative purposes, the following exemplary empirical adjustments may be made:

HMCR=(0.5+g/20 G) $HMCR_0$
PAR=(0.5+g/20 G) $PAR_0$
$f_0$ may be fixed alpha and β may decrease as improvisation is performed, and may be represented by α(g),β=β(g), where G a maximum improvisation and g is a current improvisation number. In an exemplary embodiment, the HMCR and PAR may be updated according to the present principles, for example, every 10 improvisations.

In an exemplary embodiment including a three-phased power flow, several adjustments may be made according during execution of the method 200 according to the present principles. For example, assuming the phase coupling parameters are all zero in block 201, each phase may be solved separately, without requiring optimality, to generate HMS feasible solutions (e.g., such as equation (4)). These HMS feasible solutions may be randomly combined into a new set of solutions for three-phase power flow problems, and for common variables (e.g., tap settings), average values of combinations may be selected in block 205.

In one embodiment, three small harmony searches may be running in parallel in block 206, and each phase may be searched independently, but may include coupling parameters. In one embodiment, a phase may be selected first, a harmony may be randomly selected from the other phases with a particular probability, and they may be fixed (e.g., updated) using current phase calculations in blocks 203 and 205 until a stopping criteria is reached according to various embodiments of the present principles. Data from the harmony searches may be stored in a database, and different phase variables may be selected according to their fitness function and/or probabilities in block 203 and 205 for processing and/or optimizing according to the present principles.

Referring now to FIG. 3, an exemplary three phase power distribution system 300, to which the present principles may be applied, is illustratively depicted in accordance with an embodiment of the present principles. In one embodiment, current may flow from a three phase generator 306, as represented by three Y-connected single phase sources 301, 303, and 305, which for illustrative purposes correspond to Phase A, Phase B, and Phase C, respectively. The current may flow via a three-phase transmission line 307, 309, and 311 to a three-phase load 308, and the phase sequence with respect to the order in which current flows into the three loads in block 308 may be, for example, 307→309→311 according to one embodiment of the present principles.

In some embodiments, the load flowing via the transmission line 307, 309, and 311 may be unbalanced, and a controller 302 may be employed to balance and/or optimize the loads using, for example, a multi-agent harmony search method according to the present principles. The multi-agent harmony search method according to the present principles will be described in further detail herein below with respect to FIG. 4.

Referring now to FIG. 4, an exemplary method 400 for optimizing power flows using a multi-agent harmony search with learning is illustratively depicted in accordance with an embodiment of the present principles. In one embodiment, the multi-agent harmony search with learning 402 may include decoupling phases as individual agents, and/or combining agents with a harmony search method to speed up searching for optimal unbalanced three phase power flow problems for controlling and/or planning of power systems. The multi-agent harmony search with learning in block 402 may include controlling phases using a multi-phase agent method 404 and performing a harmony search with gradient descent learning according to the present principles.

In one embodiment, variables in an unbalanced three-phase power flow problem may be separately controlled in block 404 using a multi-agent method according to the present principles. In block 406, each phase may be treated (e.g., processed) as an individual agent, where each agent determines its own phase-related decision variables (e.g., phase current, phase angle, phase voltage, etc.). Each phase agent may balance its phase current injection, supply its own phase active and reactive powers, and control power flow magnitudes according to various embodiments of the present principles. Thus, each phase agent may minimize its own objective, including, for example, penalties from constraint violations and overall system cost.

In one embodiment, harmony ranking and selection using a utility function may be performed in block 408. Harmonies in the harmony memory (HM) of each phase may be ranked by their utility values in block 408, and the harmony with a higher utility value may have a higher probability of being selected. For example, assuming the utility value of harmony k is $\mu_k$, the probability of selecting harmony k may be determined using the following equation:

$$\frac{(\mu_k)^n}{\sum_\mu (\mu_k)^n}, \quad (10)$$

where n represents a number of phases/agents.

In block 410, a phase related penalty may be present, and each agent may only be responsible for its own phase-related penalty, and not other phase penalties. For example, phase agent J would only be responsible for the penalties on phase j's current and load mismatches or phase j power flow capacity violations according to the present principles. In one embodiment, phase agent I may select a new HM to lower the penalty for phase I, but information involving phase agent J may be ignored by phase agent I according to the present principles.

In block 412, partial system penalty may be applied according to some embodiments. For example, although agents are individual decision makers, they may not be completely independent, and an addition from objective cost in an agent's objective function (e.g., equation (11)) may be performed according to the present principles. In some embodiments, the agent's decisions may affect, for example, a system's generation cost, and each phase agent may be responsible for a partial system cost via the ratio:

$$\sum_i C_i \frac{(q_{ji})^2}{\sum_j (q_{ji})^2} \quad (11)$$

where $C_i$ represents a total generation cost of a generator I, and $q_{ji}$ represents the generation dispatched by phase agent j in a generation i. In one embodiment, the phase determined to exhibit a higher generation output than other phases may take on a larger portion of the overall cost than the other phases (e.g., with lower generation outputs). Thus, a reduction of overall power system generation costs may be performed in block 404 without requiring the addition of more agents (e.g., using only current agents) to reduce the system generation costs according to the present principles.

In block 414, a harmony search may be performed, and may include gradient descent learning, which may be embedded into a modified harmony improvisation method according to various embodiments of the present principles.

In one embodiment, HM may be initialized in block 416. In one embodiment, HM may be pruned after a random initialization before execution of a multi-agent harmony search with learning method, as described above with reference to elements 201 and 206 of FIG. 2.

In some embodiments, phase coupling parameters may be assumed to be zero during the pruning, and the harmony memory may be updated independently for each agent during harmony initialization in block 416. In block 402, the pruned HMs of all agents may be input as initial harmony memories in the main multi-agent harmony search method (e.g., block 201), and after being entered into the main search method, the phase coupling parameters may resume their original values according to the present principles.

In one embodiment, harmony segmentation may be performed in block 418, and may include improvisation operators which operate only on the harmonies in each phase harmony memories. For example, in the main search method in block 402, a complete harmony may include harmonies from all agents in a power flow/power system, and a portion of harmony from an individual agent a harmony segment. The harmony improvisation and updates may be applied based on harmony segmentations rather than the complete harmony according to various embodiments of the present principles, thereby speeding up system operation and/or reducing processing requirements.

In block 420, gradient descent learning may be employed for harmony improvisation. In one embodiment, when a criteria (e.g., in decision blocks 210 and/or 212) is met, the multiple agents may update selected harmonies using a gradient descent method to move the selected harmonies to a better local neighborhood using the following equation:

$$x_j^{new} = x_j^0 - \alpha \frac{\partial J_j(x)}{\partial x_j^0}, \quad (12)$$

where $x_j^0$ is a selected harmony in phase j variables, $\alpha$ represents learning parameters, a small scale $\partial J_j(x)$ represents a cost function of agent j (which may include partial system cost and phase constraint violation penalties), and $x_j^{new}$ represents improvisation harmony according to the present principles.

In one embodiment, a model of harmony memory may be determined in block 422, and may include historical harmony memory. For example, the model may include an original complete harmony and/or harmonies morphed/transformed into new harmonies (e.g., segments) according to the present principles. The morphed or original harmony may be tested and may return with a new fitness function value. In some embodiments, a determined utility value of each harmony segmentation may not simply be updated with a new fitness function value, but may take into account both historical and current utility values using the following equation:

$$\mu(g) = (1-\varepsilon)\mu(g-1) + \varepsilon FF(g), \quad (13)$$

where $\mu(g)$ is the utility value in a $g^{th}$ iteration before selection and morphing, and $\varepsilon$ is the memory rate. Thus, the harmony memory may keep the same memory since its birth, and the probability of discarding a desirable harmony (e.g., because of improper harmony combination of all phases) is reduced according to the present principles.

In one embodiment, harmony memory with an undetermined harmony size may be dynamically updated in block 424. Unlike conventional harmony search methods, the worst harmony may not be discarded unconditionally, but rather a worst harmony may be discarded unless, for example, a randomly generated number exceeds a predetermined value. Thus, the harmony memory may be dynamic, and agents may have different harmony sizes as compared to other agents according to various embodiments of the present principles.

The harmony search with learning according to the present principles may be advantageously employed in a variety of fields, including, for example, determining and/or controlling manufacturing, optimization benchmarks, power systems, medical devices/research, a plurality of control systems, construction designs, and/or information technology application optimization according to various embodiments.

Figure 5:
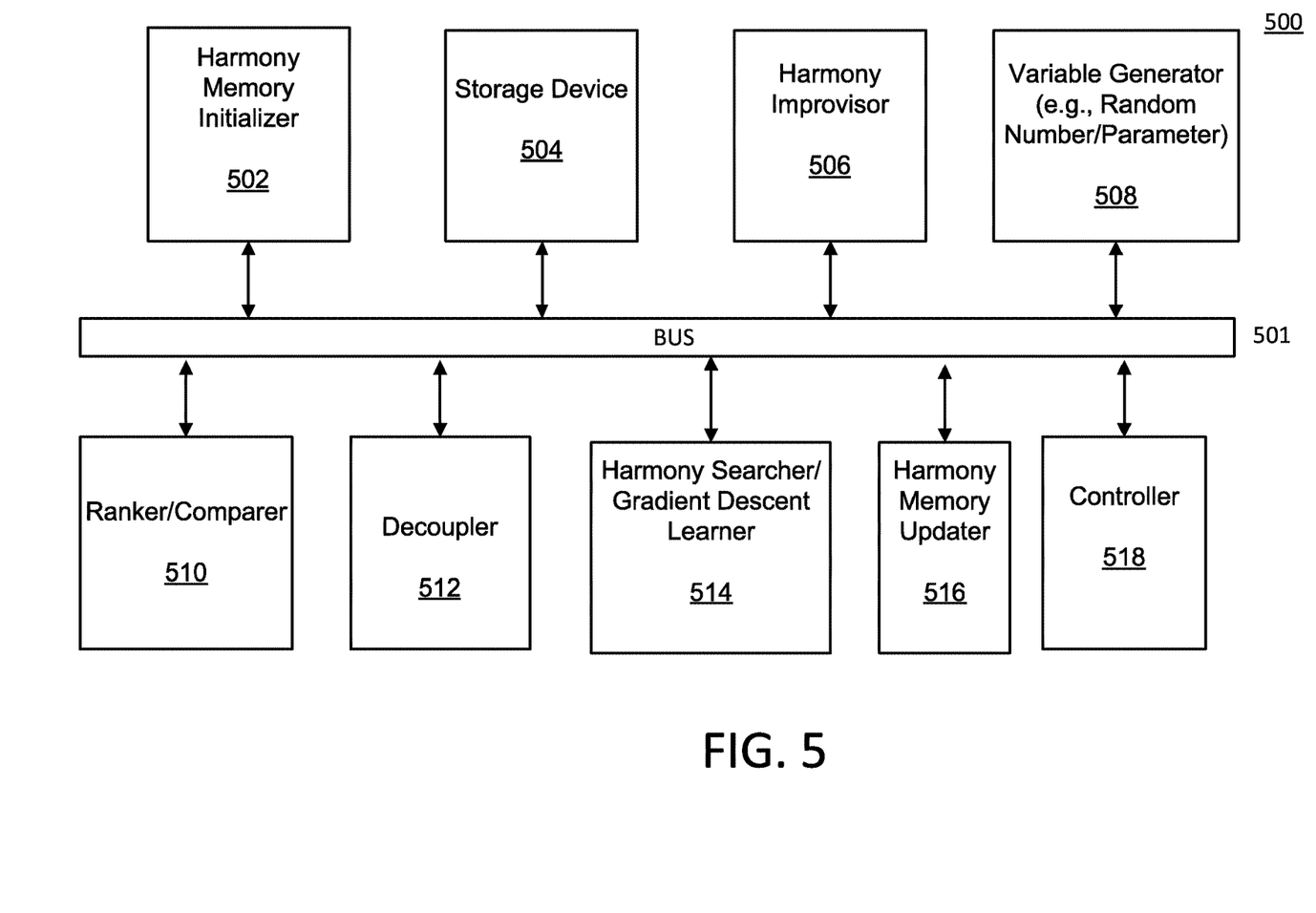
FIG. 5 shows an exemplary system for optimizing and controlling power flows using a harmony search with learning, in accordance with an embodiment of the present principles.

Referring now to FIG. 5, an exemplary system 500 for optimizing and controlling power flows using a harmony search with learning is illustratively depicted in accordance with an embodiment of the present principles.

While many aspects of system 500 are described in singular form for the sakes of illustration and clarity, the same can be applied to multiples ones of the items mentioned with respect to the description of system 500. For example, while a single controller 518 is described, more than one controller 518 (e.g., voltage controller, HM search controller, etc.) can be used in accordance with the teachings of the present principles, while maintaining the spirit of the present principles. Moreover, it is appreciated that the controller 518 is but one aspect involved with system 500 than can be extended to plural form while maintaining the spirit of the present principles.

The system 500 can include a harmony memory initializer 502, a storage device 504, a harmony improviser 506, a variable generator 508, a ranker/comparer 510, a decoupler 512, a harmony searcher including a gradient descent learner 514, a harmony memory updater 516, and/or a controller 518 according to various embodiments of the present principles.

In one embodiment, harmony memory (HM) may be initialized by a harmony memory initializer 502, and the initialized HM may include all individuals of harmony search populations, which may be referred to as a harmony vector (HV). During initialization, objective and fitness functions of each individual HV may be calculated and stored in a storage device 504 according to the present principles. A harmony improviser 506 may improvise a new harmony, and the improvisation may include generating initial random parameters (e.g., HMCR, PAR, etc.) according to some embodiments of the present principles. The improvisation may include generating random variables (e.g., numbers, parameters) using a variable generator 508, and the generated variables may be ranked and/or compared with, for example, HMCR, PAR, and/or harmonies in HM using a ranker/comparer 510.

In one embodiment, a decoupler 512 may be employed to decouple phases (e.g., in a three-phase power flow) and may treat the phases as individual agents with their own objectives during processing. This decoupling enables parallel computations among the agents, which reduces computational time and increases overall system speed and efficiency. A multi-agent harmony searcher with an embedded gradient descent learner 514 may combine the individual agents (e.g., decoupled phases) with a harmony search method to speed up searching for optimal unbalanced three-phase power flow problems, and may include generating new HVs for comparison with current HVs according to various embodiments of the present principles.

In one embodiment, a harmony memory updater 516 may update the HM with a new HV if the comparer 510 determines that a new HV is ranked better (e.g., better utility value ranking) than a worst ranked HV in the HM according to the present principles. A controller 518 may be configured to implement various features of the system 500, including, for example, decoupling three phases from a power flow to improve computation speed using parallel communication, generate new harmonies (e.g., selecting from original sets, moving to neighborhood, randomly generated, etc.), and optimizing power flows from unbalanced power flows (e.g., unbalanced three-phase power flows) according to various embodiments of the present principles.

In some embodiments, the system 500 may be employed for single-phase power flow problems. In the case of single-phase power flow problems, the variables may be segmented according to particular features of the variables. For example, features may include voltage-agents or angle-agents, which may control a group of variables sharing common features. In some embodiments, agents may include a heterogeneous learning method based on their features according to the present principles.

In the embodiment shown in FIG. 5, the elements thereof are interconnected by a bus 501. However, in other embodiments, other types of connections can also be used. Moreover, in an embodiment, at least one of the elements of system 500 is processor-based and/or a logic circuit. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 500 are readily determined by one of ordinary skill in the art, given the teachings of the present principles provided herein, while maintaining the spirit of the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method for optimizing power flows using a harmony search, comprising:
   decoupling electrical phases in a multi-phase power generation system into individual phase agents in a multi-phase power flow model for separately controlling at least one of phase variables or parameters;
   ranking and selecting one or more harmony segments from harmony memory based on a utility value determined for each of the decoupled phases;
   performing the harmony search with gradient descent learning to move the selected harmony segments to a better local neighborhood;
   determining a new utility value for each of the selected segments based on historical performance, wherein the harmony memory is iteratively updated with the selected segments if one or more of the new utility values are higher than a utility value of a worst harmony segment stored in the harmony memory, and
   dispatching power load based on the harmony search to minimize overall power distribution system costs.

2. The method recited in claim 1, wherein the multi-phase power flow model is a three-phase power flow model.

3. The method recited in claim 2, wherein the phase agents independently perform three harmony searches in parallel, the three harmony searches corresponding to the each of the decoupled phases.

4. The method recited in claim 1, further comprising:
   morphing the harmony segments into new harmony segments using the gradient descent learning during the harmony search; and
   updating the harmony memory with a new utility value for the morphed harmony segments, the new utility value being determined based on historical performance.

5. The method recited in claim 1, wherein the phase agents manage phase-related constraint violations and partial system cost increments.

6. The method recited in claim 1, wherein the power flows are unbalanced power flows.

7. The method recited in claim 1, further comprising improvising a new harmony, wherein the new harmony is improvised by at least one of selecting from original sets in harmony memory, moving to a new neighborhood, or random generation.

8. The method as recited in claim 1, wherein at least one of the variables or parameters is randomly generated.

9. A system for optimizing power flows using a harmony search, comprising:
   a power conditioning device for connecting to a power generation system to sense and decouple electrical phases in a multi-phase power flow model into corresponding individual phase agents for separately controlling at least one of phase variables or parameters; and
   a processor configured to:
   rank and select one or more harmony segments from harmony memory based on a utility value determined for each of the decoupled phases;
   perform the harmony search with gradient descent learning to move the selected harmony segments to a better local neighborhood;
   determine a new utility value for each of the selected segments based on historical performance, wherein the harmony memory is iteratively updated if one or more of the new utility values are higher than a utility value of a worst harmony segment stored in the harmony memory, and
   dispatch power load based on the harmony search to minimize overall power distribution system costs.

10. The system recited in claim 9, wherein the multi-phase power flow model is a three-phase power flow model.

11. The system recited in claim 10, wherein the phase agents independently perform three harmony searches in parallel, the three harmony searches corresponding to the each of the decoupled phases.

12. The system recited in claim 9, further comprising:
   a harmony improviser configured to morph the harmony segments into new harmony segments using the gradient descent learning during the harmony search; and
   updating the harmony memory with a new utility value for the morphed harmony segments, the new utility value being determined based on current and historical performance.

13. The system recited in claim 9, wherein the phase agents manage phase-related constraint violations and partial system cost increments.

14. The system recited in claim 9, wherein the power flows are unbalanced power flows.

15. The system recited in claim 9, further comprising an improviser configured to an improvise a new harmony, wherein the new harmony is improvised by at least one of selecting from original sets in harmony memory, moving to a new neighborhood, or random generation.

16. The system recited in claim 9, wherein at least one of the variables or parameters is randomly generated.

17. A non-transitory computer-readable storage medium including a computer-readable program, wherein the computer-readable program when executed on a computer causes the computer to perform the steps of:
   decoupling electrical phases in a multi-phase power generation system into individual phase agents in a multi-phase power flow model for separately controlling at least one of phase variables or parameters;
   ranking and selecting one or more harmony segments from harmony memory based on a utility value determined for each of the decoupled phases;
   performing a harmony search with gradient descent learning to move the selected harmony segments to a better local neighborhood;
   determining a new utility value for each of the selected segments based on historical performance, wherein the harmony memory is iteratively updated with the selected segments based on the new utility values until a stopping criteria is reached, and
   dispatching power load based on the harmony search to minimize overall power distribution system costs.

18. The non-transitory computer-readable storage medium of claim 17, wherein the multi-phase power flow is a three-phase power flow, and wherein the phase agents independently perform three harmony searches in parallel, the three harmony searches corresponding to each of the decoupled phases.

* * * * *